United States Patent [19]

Scoggins et al.

[11] Patent Number: 5,015,702

[45] Date of Patent: May 14, 1991

[54] TREATMENT OF POLY(ARYLENE SULFIDE/SULFONE) POLYMERS

[75] Inventors: Lacey E. Scoggins, Bartlesville, Okla.; Joseph G. Ceurvorst, Lakewood, Colo.

[73] Assignee: Phillips Petroleum Company, Bartlesville, Okla.

[21] Appl. No.: 417,932

[22] Filed: Oct. 6, 1989

[51] Int. Cl.⁵ .................................................. C08F 6/00
[52] U.S. Cl. .................................... 525/537; 528/481; 528/485; 528/486; 528/487; 528/490
[58] Field of Search ............... 528/481, 485, 486, 487, 528/490; 525/537

[56] References Cited

U.S. PATENT DOCUMENTS

| | | | |
|---|---|---|---|
| 3,948,857 | 4/1976 | Feasey et al. | 260/49 |
| 4,016,145 | 4/1977 | Campbell | 260/79.3 M |
| 4,127,713 | 11/1978 | Campbell | 528/391 |
| 4,247,598 | 1/1981 | Blackwell | 524/400 |
| 4,373,091 | 2/1983 | Edmonds, Jr. | 528/481 |
| 4,418,029 | 11/1983 | Reed et al. | 524/400 |
| 4,424,338 | 1/1984 | Cleary | 528/388 |
| 4,501,884 | 2/1985 | Ostlinning et al. | 528/388 |
| 4,525,579 | 6/1985 | Idel et al. | 528/388 |
| 4,535,149 | 8/1985 | Ebert et al. | 528/388 |
| 4,769,426 | 9/1988 | Iwasaki et al. | 525/537 |
| 4,774,276 | 9/1988 | Bobsein et al. | 524/399 |
| 4,794,163 | 12/1988 | Inoue et al. | 528/388 |
| 4,801,664 | 1/1989 | Nesheiwat et al. | 525/537 |
| 4,898,904 | 2/1990 | Yu et al. | 525/537 |

FOREIGN PATENT DOCUMENTS 250174 11/1986 Japan .

*Primary Examiner*—Melvyn I. Marquis
*Assistant Examiner*—David W. Woodward
*Attorney, Agent, or Firm*—Beverly M. Dollar

[57] ABSTRACT

Poly(arylene sulfide/sulfone) polymers prepared using a sulfur-rich reaction mixture are treated in order to increase melt stability by contacting the poly(arylene sulfide/sulfone) polymer with an acidic solution, followed by contacting the polymer with a soluble zinc compound.

14 Claims, No Drawings

TREATMENT OF POLY(ARYLENE SULFIDE/SULFONE) POLYMERS

FIELD OF THE INVENTION

This invention relates to the treatment of poly(arylene sulfide/sulfone) polymers. In one aspect this invention relates to a process for increasing the thermal stability of a poly(arylene sulfide/sulfone) polymer.

BACKGROUND OF THE INVENTION

Poly(arylene sulfide/sulfone) polymers are thermoplastic polymers of interest for film, fiber, molding, and composite applications because of their high glass transition points and good mechanical and electrical properties and chemical resistance.

Poly(arylene sulfide/sulfone) polymers can generally be prepared by the reaction of a polyhaloaromatic sulfone with a sulfur source and a polar organic compound, as disclosed in U.S. Pat. No. 4,127,713. In preparations of this type, it is acceptable to have present excess amounts of the sulfur source (e.g. an alkali metal sulfide) in relation to the amount of dihaloaromatic sulfone present. For purposes herein, this preparation will be referred to as a "sulfur-rich" reaction mixture. Such sulfur-rich reaction mixtures typically product poly(arylene sulfide/sulfone) polymers with a characteristic yellow color in contrast to the white color of poly(arylene sulfide/sulfone) polymers produced from reaction mixtures in which excess amounts of dihaloaromatic sulfone is present in relation to the amount of sulfur source present.

One problem experienced with poly(arylene sulfide/sulfone) polymers in the past is that they exhibited relatively low melt stability. When a sulfur-rich reaction mixture is employed, the resulting polymer often exhibits an even lower melt stability due to the presence of mercaptans or metal sulfides as end groups on polymer chains.

One problem frequently encountered in semi-commercial and commercial scale production of poly(arylene sulfide/sulfone) as described, occurs when operating closer to balanced stoichiometry (equimolar amounts of sulfur source and dihaloaromatic sulfone) than the experimental error in reactant analyses and/or charge amounts. Specifically, the aim of a preparation may be to produce the white, more melt stable poly(arylene sulfide/sulfone) by charging an excess of the dihaloaromatic sulfone relative to the sulfur source only to find, when the polymer is isolated, that, due to inaccuracies in the analyses of the concentration of the aqueous sodium sulfide used as the sulfur source, for example, or in the actual charged amounts, that what was actually present in the reactor during polymerization was an excess of the sulfur source relative to the dihaloaromatic sulfone, resulting in less melt stable, yellow poly(arylene sulfide/sulfone).

U.S. Pat. No. 4,774,276 discloses a method to produce poly(arylene sulfide/sulfone) polymers having increased melt stability by treating the poly(arylene sulfide/sulfone) polymers with a zinc source, thereby incorporating zinc cations into the polymer. It would still be desirable, however, to have a method for further improving the thermal stability of a poly(arylene sulfide sulfone) polymer, especially those made using a sulfur-rich reaction mixture.

It is therefore an object of this invention to provide a process for preparing a poly(arylene sulfide/sulfone) polymer having increased melt stability. It is further an object of this invention to provide a process for treating a poly(arylene sulfide/sulfone) polymer prepared using a sulfur-rich reaction mixture in order to improve its thermal stability.

SUMMARY OF THE INVENTION

In accordance with this invention, a poly(arylene sulfide/sulfone) polymer having increased thermal stability is prepared by contacting a poly(arylene sulfide/sulfone) polymer with a solution of a strong acid, then contacting the polymer with a soluble zinc compound.

DETAILED DESCRIPTION OF THE INVENTION

The poly(arylene sulfide/sulfone) polymers treated in accordance with this invention are those having the general formula

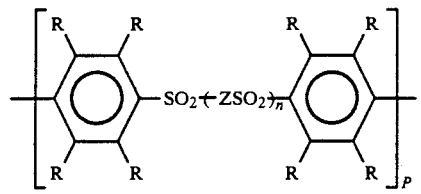

wherein P is the degree of polymerization and Z is a divalent radical selected from the group consisting of

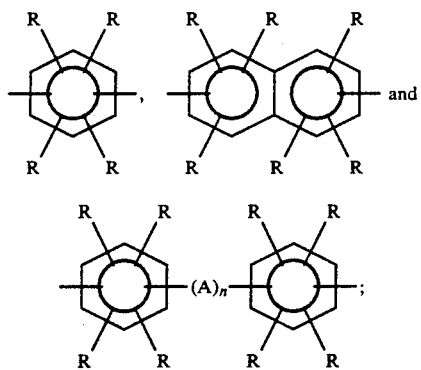

n is 0 or 1; A is selected from the group consisting of oxygen, sulfur, sulfonyl, and $CR_2$; and R is selected from the group consisting of hydrogen and alkyl radicals having 1 to about 4 carbon atoms, the total number of carbon atoms in all of the R groups in the dihaloaromatic sulfone molecule being 0 to about 12. Preferably, each n is 0. These polymers are prepared by contacting a polyhaloaromatic sulfone, a sulfur source, water and a polar organic compound under polymerization conditions.

Of the polyhaloaromatic sulfones useful in the preparation of the poly(arylene sulfide/sulfone) polymer, dihaloaromatic sulfones are preferred. Examples of suitable dihaloaromatic sulfones that can be employed include bis(p-fluorophenyl)sulfone; bis(p-chlorophenyl)sulfone; bis(p-bromophenyl)sulfone; bis(p-iodophenyl)sulfone; p-chlorophenyl p-bromophenylsulfone; p-iodophenyl 3-methyl-4-fluorophenyl sulfone; bis(2-methyl-4-chlorophenyl)sulfone; bis(2,5diethyl-4-bromophenyl)sulfone; bis(3-isopropyl-4-iodophenyl)-sulfone; bis(2,5dipropyl-4-chlorophenyl)sulfone; bis(2- butyl-4-fluorophenyl)sulfone; bis(2,3,5,6-tetramethyl-4-chlorophenyl)sulfone, 2-isobutyl-4-chlorophenyl 3-butyl-4-bromophenyl sulfone; 1,4-bis(p-chlorphenyl-sufonyl)-benzene; 1-methyl-2,4-bis(p-fluorophenylsulfonyl)benzene; 2,6-bis(p-bromophenylsulfonyl)naphthalene; 7-ethyl-1,5-bis(p-iodophenylsulfonyl)naphthalene; 4,4'-bis(p-chlorophenylsulfonyl)biphenyl; bis[p-(p-bromophenylsulfonyl)phenyl]ether; bis[p-(p-chlorophenylsulfonyl)phenyl]sulfide; bis[p-(p-chlorophenylsulfonyl)phenyl]sulfone; bis[p-(p-bromophenylsulfonyl)phenyl]methane; 5,5-bis[3-ethyl-4-(p-chlorophenylsulfonyl)phenyl]nonane, and the like, and mixtures thereof. The presently preferred dihaloaromatic sulfone due to it effectiveness and commercial availability is bis(p-chlorophenyl)sulfone.

The sulfur source which is typically used is an alkali metal sulfide. Alkali metal sulfides that can be employed in the preparation of the poly(arylene sulfide/sulfone) polymer include sodium sulfide, potassium sulfide, rubidium sulfide, cesium sulfide, and mixtures thereof. The alkali metal sulfide can be used in anhydrous form, as a hydrate, or as an aqueous mixture.

Another source of sulfur which can be employed is a combination of an alkali metal hydrosulfide and an alkali metal hydroxide. The preferred alkali metal hydrosulfide and alkali metal hydroxide due to effectiveness and availability are sodium hydrogen sulfide (NaSH) and sodium hydroxide (NaOH).

Generally, in the preparation of poly(arylene sulfide/sulfone) polymers, the amount of dihaloaromatic sulfone employed is in the range of 1.0 to 2 moles per mole of alkali metal sulfide. When lesser amounts of dihaloaromatic sulfone are used relative to the amount of alkali metal sulfide, a sulfur-rich reaction mixture results. For purposes of this application, the term sulfur-rich reaction mixture is meant to denote a reaction mixture which employs about 0.75 to about 0.99 moles preferably 0.8:1 to 0.98:1, dihaloaromatic sulfone per mole of alkali metal sulfide.

The polar organic compounds used in preparing the poly(arylene sulfide/sulfone) polymer should be substantially liquid at the reaction temperatures and pressures employed. The polar organic compounds can be cyclic or acyclic and generally have about 1 to 18 carbon atoms per molecule. Suitable polar organic compounds include organic amides such as formamide, acetamide, N-methylformamide, N,N'-dimethylformamide, N,N'-dimethylacetate, 2-pyrrolidone, N-methyl-2-pyrrolidone (NMP), ε-caprolactam, N-methyl-ε-caprolactam, N,N'-ethylenedi-2-pyrrolidone, hexamethylphosphoramide, tetramethylurea, and the like and mixtures thereof.

It is preferred that the poly(arylene sulfide/sulfone) polymer be a homopolymer. However, it is within the scope of this invention to employ copolymers containing no more than about 10 percent of comonomer repeat units based on the polymer, exclusive of fillers, plasticizers, reinforcing agents and the like.

Although the reaction temperature at which the polymerization is conducted can vary over a considerable range, generally it will be within the range of about 170° C. to about 240° C., preferably about 180° C. to about 220° C. The reaction time can vary widely, depending in part on the reaction temperature, but generally will be within the range of about 10 minutes to about 3 days, preferably about 1 hour to about 8 hours. The pressure should be sufficient to maintain the dihaloaromatic sulfone, the polar organic compound, and the water substantially in the liquid phase.

The poly(arylene sulfide/sulfone) polymers can be separated from their reaction mixture in any manner known to those of ordinary skill in the art. One suitable method employs the addition of a separation agent in order to separate the polymer from the polar organic compound and non-polymeric liquid components and unconsumed reactants. The polymer can then be washed with water and optionally water-miscible solvents such as acetone or methanol in order to remove impurities and by-product salts. If desired, at least a portion of the washing can be conducted at an elevated temperature, for example up to about 200° C.

Subsequent to the recovery of the poly(arylene sulfide/sulfone) polymer and washing, if employed, the poly(arylene sulfide/sulfone) polymer is treated with a strong acidic solution. Any suitable organic or inorganic acids which are water soluble can be used in the acidic treating solution. Examples of suitable organic acids include, but are not limited to oxalic acid, maleic acid and trichloroacetic acid. Examples of suitable inorganic acids include, but are not limited to, hydrochloric acid, sulfuric acid, phosphoric acid, nitric acid, chromic acid and sulfurous acid. The presently preferred inorganic acid is nitric acid.

Generally, the polymers are contacted with the acidic solution at a temperature of about 0° C. to 300° C. Preferably, the polymers are contacted with the acidic solution at a temperature of about 100° C. to 200° C. The pressure employed in the contacting step may vary from about 0 to 1500 psig.

The time for contacting the polymers with acidic solution can very widely, depending in part on the temperature and particular polymer employed. The contacting time will generally be within a range of about 30 seconds to 3 hours, preferably from about 1 minute to 1 hour. Repeated treatments can be employed if desired, and the process can be carried out in several stages if desired.

The amount of acidic solution employed will depend upon the molar strength of the particular acid. Generally, the amount of the acidic component present in the acidic solution will not exceed about 3.0 weight percent of the total weight of the acidic solution. Preferably the amount of acidic component present in the solution will range from about 0.05 to about 2.0 weight percent, more preferably from about 0.1 to about 1.0 weight percent. The amount of acid used will generally be in the range of about 0.07 to about 20 weight percent, preferably from about 0.7 to about 7.0 weight percent, based on the weight of the polymer.

When practicing this invention, the amount of acidic solution, temperature of treatment, and time of treatment should be such that substantially no oxidative curing of the poly(arylene sulfide/sulfone) polymer occurs.

The heating and contacting with the acidic solution can be carried out with conventional equipment. A convenient method for carrying out the process is to contact the polymer and acidic solution in an enclosed tank provided with agitation. The contacting can be carried out in a single vessel or with a plurality of vessels. The polymers can be recovered after contacting by suitable techniques including for example, filtration and the like.

Following the treatment of the poly(arylene sulfide/sulfone) polymer with the acidic solution, the poly(arylene sulfide/sulfone) polymer is contacted with a soluble zinc compound at a sufficient temperature and pressure for a period of time sufficient to incorporate an amount of zinc cations effective to improve the melt stability of the polymer.

In this invention, any suitable soluble zinc compound can be employed. It is preferred that the zinc compound be a water soluble zinc salt. It is even more preferred that the zinc salt be a zinc halide or a zinc carboxylate. The salts of zinc which are more preferred include zinc chloride, zinc bromide, zinc iodide, zinc acetate, and the like and mixtures thereof. The most preferred zinc salts due to their effectiveness and availability are zinc chloride and zinc acetate.

Generally, the polymers are contacted with the zinc compound at a temperature of about 0° C. to 300° C. Preferably the polymers are contacted with the zinc compound at a temperature of about 100° C. to 200° C.

The amount of the soluble zinc compound added to contact the polymer can vary depending upon the qualities desired in the final treated polymer. Generally the amount of soluble zinc compound used to contact the polymer will be within the range of about 0.01 to 10, preferably about 0.25 to 2 weight percent based on the total weight of the polymer.

It is preferred to employ the soluble zinc compound in an aqueous solution. If such a solution is used, the concentration of the zinc salt in solution preferably ranges from 0.001 weight percent up to the solubility limits of the particular salt employed. Preferably, the zinc salt in solution is in the range of about 0.1 to 5 weight percent of the solution.

The time for contacting the polymers with the zinc compound can vary widely, depending, in part, on the temperature of contacting and the nature of the polymers. The contacting time will generally be within a range of about 30 seconds to 3 hours, preferably from about 1 minute to 1 hour. The pressure employed should be sufficient to maintain liquid phase conditions and will generally range from about 0 to 1,500 psig. Repeated treatments can be employed, if desired, and the process can be carried out in several stages, if desired.

The heating and contacting with the soluble zinc compound can be carried out with conventional equipment. A convenient method for carrying out the process is to contact the polymers and zinc compound in an enclosed tank provided with agitation. The contacting can be carried out in a single vessel or with a plurality of vessels.

Subsequent to treating the poly(arylene sulfide/sulfone) polymer with the soluble zinc compound, the polymer is recovered by conventional means, for example such as filtration. The polymer can subsequently be washed with water, and optionally water-miscible solvents at ambient or elevated temperatures.

The final recovered poly(arylene sulfide/sulfone) polymer can optionally have other ingredients incorporated including extenders, fillers, pigments, plasticizers, stabilizers etc. It should be noted, however, that additives which might adversely affect the thermal stability of the polymer should be avoided. The poly(arylene sulfide/sulfone) polymers treated by the present invention exhibit enhanced thermal stability.

In certain applications, it may be desirable to add additional strength to the polymer. Polymer strength can be increased by incorporating strengtheners such as fibers into the polymer to form a composite material. Preferred strengtheners, due to their effectiveness, are inorganic fibers such as asbestos, glass, and carbon and the like.

EXAMPLES

The examples provided herein are intended to assist in a further understanding of this invention. Particular materials employed, species and conditions are intended to illustrate this invention and are not meant to limit the reasonable scope thereof.

The melt stability of the polymers was assessed by noting the change in the rate of melt flow of each polymer after being retained in a barrel of a melt index apparatus under ASTM D1238 conditions for a time ranging from about five minutes to about thirty minutes at an elevated temperature. That temperature is 343° C. for poly(phenylene sulfide/sulfone) polymers.

The melt flow measurement at arbitrarily selected times is determined by extruding the molten polymer through the orifice in the barrel using a five kilogram driving weight. The time required to extrude a predetermined volume of polymer through the orifice is recorded and the weight of the cooled extrudate is measured. The melt flow is calculated in terms of grams of polymer extruded per 10 minutes of flow. If there is little difference in the melt flow of the polymer using hold periods of five minutes and thirty minutes, then it is apparent that a stable melt flow product is being tested. Generally, a melt flow decrease occurs, indicated by a longer extrusion time required to extrude a predetermined amount of polymer from the barrel. However, in some instances, a melt flow increase occurs, indicated by a shorter time required to extrude a predetermined amount of polymer from the barrel.

EXAMPLE I

To a 90 gallon, heated, stirred pilot plant reaction vessel was charged 94.8 lb. (0.3 lb. mole) of bis-(p-chlorophenyl) sulfone, 10.0 gallons (0.9 lb. mole) of N-methyl-2-pyrrolidone (NMP), 34.4 lb. (1.9 lb. mole) of water, 26.3 lb. (0.3 lb. mole) of sodium acetate and 3.4 lb. (0.03 lb. mole) of sodium carbonate. To a separate mixing vessel was charged 23.1 lb. of a 49.9 weight percent aqueous solution of sodium hydroxide (0.3 lb. mole of NaOH), 30.4 lb of an aqueous solution analyzed to contain 59.0 weight percent sodium hydrosulfide and 0.4 weight percent sodium sulfide and 14.5 gallons (1.3 lb. mole) of NMP. After mixing the latter materials, the mixture was flushed into the 90 gallon reaction vessel using an additional 16.3 gallons (1.4 lb. mole) of NMP. Heating was begun at the rate of 2.46 F/min. while stirring at 500 rpm. When the temperature reached 392° F., it was held there for 210 minutes followed by the addition to the reactor of 2.3 gallons of water while increasing the stirring speed to 550 rpm. The system was then cooled to 225° F. over a period of 95 minutes. The product polymer was then recovered by filtration, hot water washing, hot aqueous zinc acetate washing and drying. In the hot zinc acetate wash, zinc acetate was added at the 1.0 weight percent level, based on polymer weight, to the polymer which had been reslurried in water. The slurry was then heated to 350° F. for about 30 minutes with agitation. The slurry was then filtered and the polymer was dried. The recovered polymer had the characteristic yellow color of PPSS polymer resulting from a sulfur-rich polymerization recipe. This polymer is hereinafter referred to as Resin 1.

Flow rate stability was determined on samples of Resin 1 by measuring the flow rate after 5 and 30 minute hold times in the melt flow apparatus. The flow rate extrudate was also evaluated for gas evolution, color, clarity and texture, using a scale of 1 to 4, where 1 represents an extrudate with little or no gas evolution, very light color, good clarity and smooth, even texture and 4 represents an extrudate with much bubbling and gas evolution, dark color, poor clarity and a rough, uneven texture. These data are given in Table I.

Samples of Resin 1 were subjected, individually, to (A), a nitric acid wash only, (B), an aqueous zinc acetate wash only and (C), a nitric acid wash followed by an aqueous zinc acetate wash. In each experiment, the polymer was reslurried in 80 gallons of deionized water. Nitric acid or zinc acetate was added at 1.0 weight percent, based on polymer weight. The slurry was heated to 350° F. and held there for 30 minutes with agitation. The slurry was then cooled to 120° F., filtered and the collected solids were dried. The washed products were each subjected to the same melt flow stability and extrudate evaluation test as described above for Resin 1. These data are recorded in Table I, with Resin 1 being the product from the original zinc acetate wash only, Resin 2 being the product from a second zinc acetate wash, Resin 3 being the product from the acid wash only and Resin 4 being the product from the acid wash followed by the zinc acetate wash.

TABLE I

| | Melt Flow Stability | | | |
|---|---|---|---|---|
| | Flow Rate, g/10 min. | | Extrudate Rating, gas/color/ clarity/texture | |
| | 5 min. | 30 min. | 5 min. | 30 min. |
| Resin 1 | 6.6 | 10.5 | 1/2/1/1 | 4/4/1/4 |
| Resin 2 | 5.8 | 5.7 | 2/2/1/1 | 3/3/1/3 |
| Resin 3 | 4.6 | 0 | 2/2/1/3 | 4/4/4/4 |
| Resin 4 | 4.7 | 4.5 | 1/2/1/1 | 2/3/1/3 |

As the data in Table I show, the flow rate stability of both Resin 2 (second zinc acetate wash only) and Resin 4 (acid wash followed by zinc acetate wash) are markedly superior to that of Resin 1 (one zinc acetate wash) and Resin 3 (acid wash only) using the change in flow rate between 5 minutes and 30 minutes in the melt flow apparatus as the determining factor. Additionally, it can be seen by examining the extrudate rating that Resin 4 (acid wash followed by zinc acetate wash) exhibits an extrudate which is superior to that of Resin 2 (second zinc acetate wash only) in gas and is equivalent to that of Resin 2 in color, clarity, and texture. Thus, neither the acid wash alone nor the zinc acetate wash alone produces the high degree of melt stability produced by using the acid wash followed by the zinc acetate wash.

Resin 5 was prepared in a manner analogous to the preparation of Resin 1, but Resin 5 had the characteristic white color of a PPSS polymer made from a polymerization recipe which was not sulfur-rich. Resin 5 was subjected to a hot aqueous zinc acetate wash analogous to that given to Resin 1. The product from this wash is hereinafter referred to as Resin 6. Resin 6 was subjected to the same melt flow stability and extrudate rating tests as applied to Resins 1 through 4, above. These data, along with a repetition of the corresponding data for Resin 1 and 2 for comparisons, are presented in Table II.

TABLE II

| | Comparison Data | | | |
|---|---|---|---|---|
| | Flow Rate, g/10 min. | | Extrudate Rating, gas/color/ clarity/texture | |
| | 5 min. | 30 min. | 5 min. | 30 min. |
| Resin 6 | 48.9 | 47.9 | 1/2/1/1 | 2/3/1/1 |
| Resin 1 | 6.6 | 10.5 | 1/2/1/1 | 4/4/1/4 |
| Resin 2 | 5.8 | 5.7 | 2/2/1/1 | 3/3/1/3 |

As the data in Table II show, the zinc acetate wash, alone, is successful in producing a melt stable PPSS polymer for polymer prepared from a polymerization recipe which is not sulfur-rich, whereas this is not the case for a polymer prepared from a polymerization recipe which is sulfur-rich.

That which is claimed is:

1. A method for treating a poly(arylene sulfide/sulfone) polymer in order to improve the thermal stability of said polymer which comprises:
    (a) contacting said poly(arylene sulfide/sulfone) polymer with an aqueous solution of an acid selected from the group consisting of oxalic acid, maleic acid, trichloroacetic acid, hydrochloric acid, sulfuric acid, phosphoric acid, nitric acid, chromic acid, sulfurous acid and mixtures thereof; then
    (b) contacting said poly(arylene sulfide/sulfone) polymer with an aqueous solution of a water soluble zinc compound; wherein said poly(arylene sulfide/sulfone) polymer is prepared by reacting under polymerization conditions a dihaloaromatic sulfone with an alkali metal sulfide and a polar organic compound and water and wherein the molar ratio of alkali metal sulfide to dihaloaromatic sulfone is in the range of about 1:0.75 to 1:0.99.

2. A method according to claim 1 wherein said poly(arylene sulfide/sulfone) polymer is poly(phenylene sulfide/sulfone).

3. A method according to claim 1 wherein said poly(arylene sulfide/sulfone) polymer is produced by reacting a dihaloaromatic sulfone, an alkali metal sulfide, a polar organic compound, and optionally water under polymerization conditions to form a reaction slurry comprising a poly(arylene sulfide/sulfone) polymer; and then recovering said poly(arylene sulfide/sulfone) from said reaction slurry; wherein the molar ratio of dihaloaromatic sulfone to alkali metal sulfide is in the range of 0.8:1 to 0.98:1.

4. A method according to claim 1 wherein said soluble zinc compound is selected from the group consisting of zinc halides and zinc carboxylates and is employed in an aqueous solution wherein the concentration of zinc in said solution is 0.01 to 10 weight percent based on the weight of the neat polymer.

5. A method according to claim 4 wherein zinc acetate is employed as said zinc compound.

6. A method according to claim 1 wherein said step (a) contacting occurs at a temperature in the range of 0° C. to 300° C.

7. A method according to claim 1 wherein said step (b) contacting occurs at a temperature in the range of 0° C. to 300° C.

8. A method according to claim 1 wherein said strong acid comprises nitric acid.

9. A method according to claim 1 wherein said polymer is further washed with deionized water after step (b).

10. A method according to claim 9 wherein said water washing is conducted at a temperature in the range of ambient temperature to 200° C.

11. A method according to claim 1 wherein said step (a) contacting occurs over a time period of about ½ minute to 3 hours.

12. A method according to claim 1 wherein said step (b) contacting occurs over a time period of about ½ minute to 3 hours.

13. A method for treating a poly(arylene sulfide/sulfone) polymer which comprises
 (a) contacting said poly(arylene sulfide/sulfone) polymer with a nitric acid solution at a temperature in the range of 100° to 200° C. for a period of 1 minute to 1 hour, wherein the nitric acid component is present in an amount of about 0.1 to 10 weight percent of the acid solution;
 (b) contacting said poly(arylene sulfide/sulfone) polymer with an aqueous solution of zinc acetate at a temperature in the range of 100° to 200° C. for a period of 1 minute to 1 hour wherein the concentration of zinc in said solution is in the range of 0.25 to 2 weight percent, based on the weight of said polymer; then
 (c) recovering the thus treated poly(arylene sulfide/sulfone) polymer.

14. A method according to claim 13 which further comprises washing the polymer with water after step (b).

* * * * *

UNITED STATES PATENT AND TRADEMARK OFFICE
CERTIFICATE OF CORRECTION

PATENT NO. : 5,015,702

DATED : May 14, 1991

INVENTOR(S) : Joseph G. Ceurvorst

It is certified that error appears in the above-identified patent and that said Letters Patent is hereby corrected as shown below:

Col. 8, claim 3, line 43, delete "optionally".

Signed and Sealed this

Twenty-first Day of June, 1994

Attest:

BRUCE LEHMAN

*Attesting Officer*   *Commissioner of Patents and Trademarks*